United States Patent
Edelson et al.

(10) Patent No.: US 10,387,543 B2
(45) Date of Patent: Aug. 20, 2019

(54) PHONEME-TO-GRAPHEME MAPPING SYSTEMS AND METHODS

(71) Applicant: Vkidz, Inc., Fort Lauderdale, FL (US)

(72) Inventors: John Edelson, Fort Lauderdale, FL (US); Jose Perez-Diaz, Boca Raton, FL (US); Kris Craig, Margate, FL (US); Obiora Obinyeluaku, Tamarac, FL (US); Harold Milenkovic, Weston, FL (US)

(73) Assignee: VKIDZ, INC., Fort Lauderdale, FL (US)

( * ) Notice: Subject to any disclaimer, the term of this patent is extended or adjusted under 35 U.S.C. 154(b) by 0 days.

(21) Appl. No.: 15/259,729

(22) Filed: Sep. 8, 2016

(65) Prior Publication Data

US 2017/0110114 A1     Apr. 20, 2017

Related U.S. Application Data

(60) Provisional application No. 62/241,942, filed on Oct. 15, 2015, provisional application No. 62/269,471, filed on Dec. 18, 2015.

(51) Int. Cl.
*G10L 13/08* (2013.01)
*G10L 15/187* (2013.01)
*G06F 17/22* (2006.01)

(52) U.S. Cl.
CPC .......... *G06F 17/2217* (2013.01); *G10L 13/08* (2013.01); *G10L 15/187* (2013.01)

(58) Field of Classification Search
CPC .............................. G10L 13/08; G10L 15/187
See application file for complete search history.

(56) References Cited

U.S. PATENT DOCUMENTS

| | | |
|---|---|---|
| 6,009,397 A | 12/1999 | Siegel |
| 6,347,295 B1 | 2/2002 | Vitale et al. |
| 6,729,882 B2 | 5/2004 | Noble |
| 6,869,286 B2 | 3/2005 | Furry |
| 8,032,377 B2 | 10/2011 | Massimino |
| 8,751,230 B2 | 6/2014 | Saffer |

(Continued)

OTHER PUBLICATIONS

Ove Andersen et al., "Comparison of Two Tree-Structured Approaches for Grapheme-to-Phoneme Conversion".

(Continued)

*Primary Examiner* — Bryan S Blankenagel
(74) *Attorney, Agent, or Firm* — Metrolex IP Law Group, PLLC

(57) ABSTRACT

Systems and methods for automatically mapping English phonemes to graphemes to support better reading and spelling instruction may include a mapping process for systematically dividing text words into graphemes made up of one or more text characters corresponding to appropriately identified phonemes (which may be represented by one or more phonetic characters). The process may also include automatically correlating each phoneme of a word with a grapheme representing the phoneme in order to produce a phoneme-to-grapheme map that may be optimized for educational use. Some embodiments may include a teaching process for presenting the results of the mapping process to students.

10 Claims, 7 Drawing Sheets

(56) References Cited

U.S. PATENT DOCUMENTS

| | | | |
|---|---|---|---|
| 8,930,192 B1* | 1/2015 | Meisel | G10L 13/08 704/260 |
| 2002/0049591 A1* | 4/2002 | Hain | G10L 13/08 704/243 |
| 2003/0049015 A1* | 3/2003 | Cote | G11B 27/034 386/231 |
| 2003/0120482 A1* | 6/2003 | Tian | G10L 15/12 704/209 |
| 2005/0102143 A1* | 5/2005 | Woodward | G09B 19/08 704/254 |
| 2005/0182616 A1* | 8/2005 | Kotipalli | G06F 17/2217 704/2 |
| 2005/0197838 A1 | 9/2005 | Lin et al. | |
| 2006/0195319 A1* | 8/2006 | Prous Blancafort | G10L 15/18 704/235 |
| 2007/0083369 A1* | 4/2007 | McCuller | G10L 15/187 704/254 |
| 2007/0112569 A1 | 5/2007 | Wang et al. | |
| 2007/0156404 A1* | 7/2007 | Lee | G06F 17/30681 704/254 |
| 2007/0233490 A1 | 10/2007 | Yao | |
| 2009/0157383 A1* | 6/2009 | Cho | G10L 15/005 704/8 |
| 2011/0093259 A1* | 4/2011 | Saffer | G10L 15/06 704/9 |
| 2013/0143184 A1 | 6/2013 | Neikrug et al. | |
| 2013/0253903 A1* | 9/2013 | Stephen | G06F 17/27 704/2 |
| 2013/0275117 A1* | 10/2013 | Winer | G06F 17/2863 704/3 |

OTHER PUBLICATIONS

John A. Bullinaria, "Text to Phoneme Alignment and Mapping for Speech Technology: A Neural Networks Approach".

A. Chalamandaris et al., "Rule-based grapheme-to-phoneme method for the Greek", Interspeech 2005, Sep. 4-8, Lisbon, Portugal.

Lucian Galescu et al., "Bi-directional Conversion Between Graphemes and Phonemes Using a Joint N-gram Model", Fourth ISCA ITRW on Speech Synthesis, Aug. 29-Sep. 1, 2001, Perthshire, Scotland.

Axel Horndasch et al., "Phoneme-to-Grapheme Mapping for Spoken Inquiries to the Semantic Web", INTERSPEECH 2006—ICSLP, Sep. 17-21, Pittsburgh, Pennsylvania.

Rohit Kumar et al., "Building Non-Native Pronunciation Lexicon for English Using a Rule Based Approach", International Conference on Natural Language Processing (ICON), Dec. 2003, Mysore, India.

Jianna Jian Zhang et al., "Learning English Grapheme Segmentation Using the Iterated Version Space Algorithm".

* cited by examiner

PHONEME-TO-GRAPHEME MAPPING SYSTEMS AND METHODS

CROSS REFERENCE TO RELATED APPLICATIONS

The present application is related to and claims the benefit of priority to U.S. Provisional Patent Application No. 62/241,942, entitled "Phoneme-to-Grapheme Mapping Systems and Methods," filed on Oct. 15, 2015, and to U.S. Provisional Patent Application No. 62/269,471, entitled "Phoneme-to-Grapheme Mapping Systems and Methods," filed on Dec. 18, 2015, the entire contents of both of which are incorporated herein by reference.

FIELD

This invention generally relates to automated language processing systems and more particularly to a system for automatically mapping word phonemes to graphemes.

BACKGROUND

Phonics is the study of sound to spelling correlations. Phonics instruction may include a method of teaching people to read by correlating sounds with letters or groups of letters in an alphabetic writing system. Phonics, as described herein, involves connections between two main components: phonemes, which may be a spoken sound for a word-part; and graphemes, which may be one or more letters representing the same word-part. Phonemes may be represented by a phonetic alphabet, such as the International Phonetic Alphabet, which may be composed of symbols representing phonemes (sounds) for a particular language.

The correlation of phonemes to graphemes to form a lexicon is typically a time consuming manual process based on the knowledge of native speakers and/or readers. The process is prone to errors such as omissions because mappings between graphemes and phonemes can be numerous. This complicates the teaching of language as well as other pursuits.

BRIEF DESCRIPTION OF THE DRAWINGS

Certain novel features are set forth with particularity in the claims that follow. A further understanding of some of the features and advantages of some embodiments will be obtained by reference to the following detailed description that sets forth illustrative embodiments, in which certain non-limiting principles are utilized, and the accompanying drawings of which:

DETAILED DESCRIPTION

Figure 1:
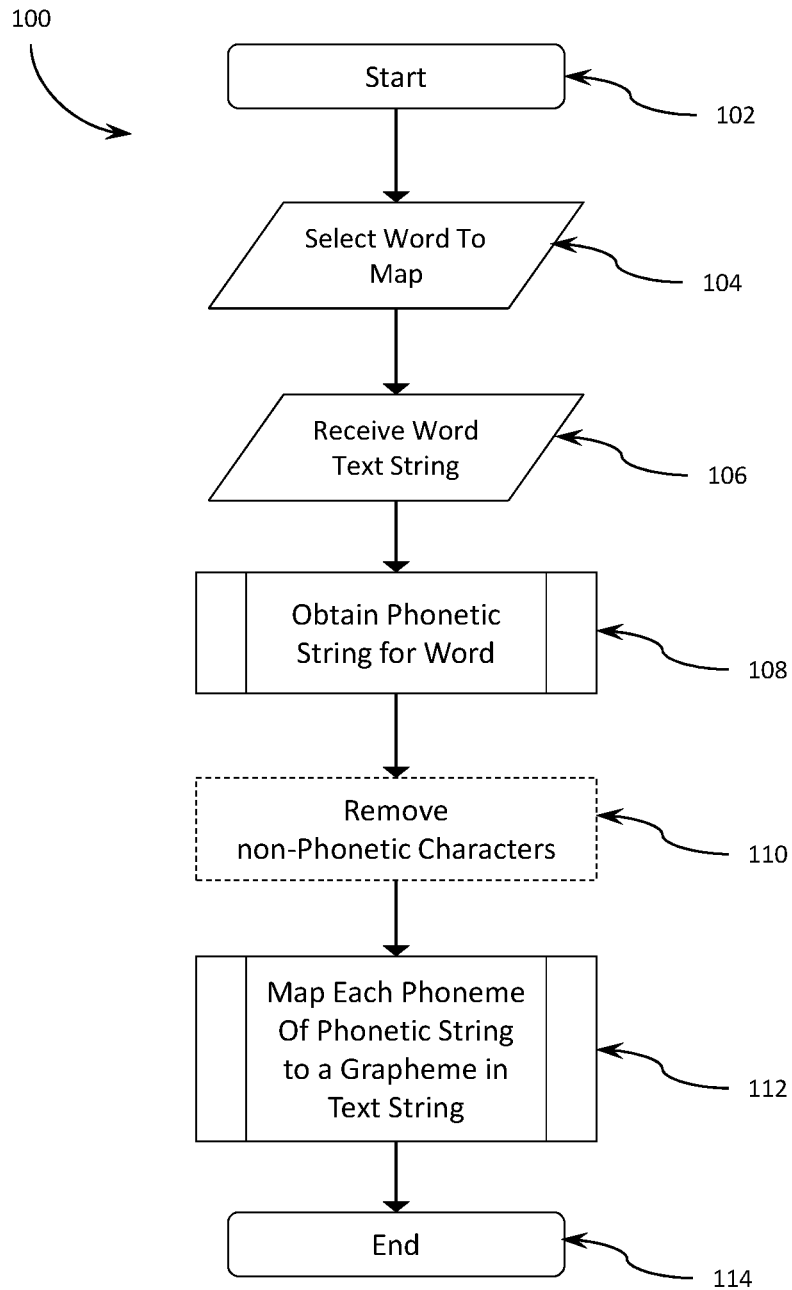
FIG. 1 is a process flow diagram illustrating an embodiment process for automatically mapping phonemes to graphemes.

The various embodiments will be described in detail with reference to the accompanying drawings. References made to particular examples and implementations are for illustrative purposes, and are not intended to limit the scope of the invention or the claims. Various features of the different disclosed embodiments can be combined to form further embodiments, which are part of this disclosure.

In the English language, multiple graphemes may correspond to a single phoneme (e.g. "a" vs. "eigh"). The opposite is also true: a single grapheme may correspond to multiple phonemes (e.g., the "s" in "sugar" vs. the "s" in "sun"). These and other factors substantially complicate the automation of teaching reading and writing of the English language. The present disclosure provides systems and methods for automating the mapping of English phonemes to graphemes and other aspects of teaching English language reading and writing.

In order to simplify the automated teaching of English, the inventors have developed a systems and methods for automatically mapping English phonemes to graphemes to support better reading and spelling instruction. The system may generally include a mapping process for systematically dividing text words into graphemes made up of one or more text characters corresponding to appropriately identified phonemes (which may be represented by one or more phonetic characters). The process may also include automatically correlating each phoneme of a word with a grapheme representing the phoneme in order to produce a phoneme-to-grapheme map that may be optimized for educational use. Some embodiments may include a teaching process for presenting the results of the mapping process to students.

In the process diagrams described below, each block of any shape may comprise a single-step instruction or a plurality of instructions, steps, procedures, sub-procedures, processes, sub-processes, etc, executing on a processor, a controller, a device, or other device or combinations of devices capable of executing the instructions. The instructions for performing any of the steps or processes may be written in any computer-executable language as appropriate for a particular application.

As used herein, the term "phoneme" may refer to a discrete sound corresponding to a single grapheme (as defined herein). In various embodiments described herein, all phonemes in a word may be represented by a "phonetic string" made up of a plurality of "phonetic characters." The phonetic characters making up a phonetic string may comprise any commonly or uncommonly used phonetic alphabet. For example, the International Phonetic Alphabet (IPA) is based on the Latin alphabet, but contains additional characters as well as accented characters beyond those commonly used in English spelling. Many other phonetic alphabets and pronunciation respelling systems also exist and may be used to form phonetic strings within the meaning of the present disclosure.

In some cases, a single phoneme may be specified by multiple phonetic characters. For example, the International Phonetic Alphabet (IPA) characters "tʃ" represent the phoneme associated with the Latin letters "ch" in the word "church." Therefore, in some cases, a phoneme may be represented by a single phonetic character, while in other cases, a phoneme may be represented by two or more phonetic characters. Depending on the phonetic character set being used, each phonetic character in a multi-character phoneme (i.e., a phoneme represented by two or more phonetic characters) may individually be associated with a different phoneme.

As used herein, the term "grapheme" may refer to a text character or a group of text characters corresponding to the pronunciation of a single phoneme. The term "text character" may refer to individual letters or characters representing discrete units of spelling in the written language in which words are to be mapped. The term "text string" may refer to an ordered sequence of letters or characters representing a word. For example, Latin letter characters may be the text characters making up text strings for English-language words.

In some cases, a grapheme may be made up of a plurality of text characters if all of those text characters contribute to the same phoneme. For example, depending on the word being mapped, the phoneme represented by the IPA characters "eə" may correspond to various graphemes such as "air" (as in the word "pair"), "ere" (as in the word "there"), and "ear" (as in the word "bear").

As used herein, verb forms of the word "map" (e.g., "map", "mapping", or "mapped") may refer to a process for associating each phoneme of a word with a corresponding grapheme. In other words, "mapping" may be described as correlating, coupling, or associating a phoneme (made up of one or more phonetic characters) character to a grapheme (made up of one or more text characters. A word may be said to have been successfully mapped if each phoneme in a phonetic string for the word is successfully associated with a single grapheme (which may be made up of multiple text characters).

When used as a noun, a phoneme-to-grapheme "map" of a word may refer to data identifying the phonemes of the word and identifying a grapheme corresponding to each phoneme. The data representing a phoneme-to-grapheme map may be stored in a database, file system, or other electronic data storage system.

FIG. 1 illustrates an example high-level process 100 executed on a device, such as a computing device (e.g., a processor of a computing device), for mapping phonemes to graphemes, such as in a block of text containing characters, strings of characters, textual words, etc. that are recognizable by a device. The process 100 may start in block 102, such as by being invoked by another process executing on the processor of the device, or by an action of a user or other operator. The action by a user or other operator may be an action, such as an interaction through a user interface of a device, or other interaction that begins execution of the process 100. The device executing the process 100 may select a word to be mapped in block 104 and may receive a text string spelling the word in letters at block 106.

The device executing the process 100 may obtain a string of phonetic characters (e.g., "phonetic string") to use for the mapping in block 108. In some cases, the process may optionally remove un-necessary or superfluous non-phonetic characters from the phonetic string for the word in block 110. Specifically, characters in the phonetic string that do not contain phonetic data may be removed. Characters that are removed may represent impurities in the phonetic string that were introduced by the process that generated the string that do not represent phonetic data. Examples of non-phonetic characters may include comas, colons, hyphens, numbers, etc. The device executing the process 100 may map each individual phoneme to a grapheme of one or more of the text characters in block 112.

In some embodiments, e.g. of a process 100 such as that shown in FIG. 1, selecting a word in block 104 may comprise a processor of a device receiving a user input (e.g., from a user interface including a keyboard, mouse, display, etc.) identifying a word to be mapped, such as by a user clicking a hyperlink associated with the word, or by a user typing a word, or by any other user input identifying a word. In other embodiments, selecting a word 104 may comprise a device, such as a processor of a device, executing a process for selecting a word for mapping from a database or other data store available to the device from a local storage, network storage, cloud storage, etc. The processor of the device may select the word based on some selection criteria, such as a first-in-first-out system, a last-in-first-out system, a random selection, a ranked-order selection (e.g., based on an alphabetical sequence), or any other method by which an automated processing system may select a word to be mapped from a plurality of available words.

In some embodiments, selecting a word in block 104 may comprise the processor of the device identifying or selecting an index value that is associated with a word's text string and phonetic string. Thus, in some embodiments, receiving the word text string in block 106 may comprise retrieving a text string for the selected word from a data store based on an index value or other identifier that may have been obtained or generated during selecting a word in block 104.

In some embodiments, selecting a word in block 104 may comprise the processor of the device identifying a word in a block of text. For example, a user may operate a user interface device to select, highlight, click on, or otherwise identify one or more words in a block of text (e.g., a plain text file, text document file or other written document, text buffer, etc.) containing words of prose, poetry or other contents.

Some words in the English language are pronounced differently depending on the usage context or intended meaning. For example, the word spelled "wind" may be pronounced differently depending on intended meaning. The word "wind" can refer to a noun for a natural movement of air (e.g., the "wind" blew). The word "wind" may also refer to a verb for the action of moving an object in a twisting or spiral manner (e.g., "wind" the clock). Because the list of such words is relatively short, those words that have different pronunciations depending on usage may be identified as such in a data store.

Therefore, in some embodiments, obtaining a phonetic string in block 108 for the selected word may comprise the processor of the device executing the process 108 by determining whether the selected word (e.g., as selected in block 104) has multiple possible pronunciations based on context or usage. In response to determining that the word has multiple possible pronunciations, the processor of the device executing the process 108 may evaluate the context or intended meaning of the selected word to be mapped. Evaluation of the context or intended meaning of a word, such as would be intuitively performed by a native language speaker, may not be intuitive or natural to a language learner. Thus, evaluation of the context or intended meaning may be automatically performed by a processor executing a software instruction or instructions in various embodiments. In some embodiments, the processor may present selections for the context that may be confirmed by a user. Alternatively, the context or intended meaning may be provided by the user.

In other embodiments, after determining that the selected word is associated with multiple phonetic strings, the processor of the device may obtain a phonetic string for the selected word in block 108 by selecting one of the possible phonetic strings and mapping the word using the selected phonetic string. For example, the selection of one of the multiple possible phonetic strings may be made by the processor of the device using a random choice. Alternatively, the choice of one of the multiple possible phonetic strings by the processor of the device may be based on a ranked ordered list such as an alphabetical listing, a listing based on frequency of occurrence within written or spoken language, or another ranking. The processor of the device may store or cause a system component to store the phoneme-to-grapheme mapping results along with an indication of the usage case associated with the selected one of the possible multiple phonetic strings.

In some embodiments, removing un-necessary phonetic characters from the phonetic string in block 110 may include removing any characters that might be present, but that do not convey phonetic meaning. For example, some phonetic strings may include slashes ("/"), backslashes ("\"), dashes ("-"), pipes ("|"), commas, apostrophes, or other characters that may indicate separations between syllables, or other information that may be superfluous to the phoneme-to-grapheme mapping process.

Figure 2:
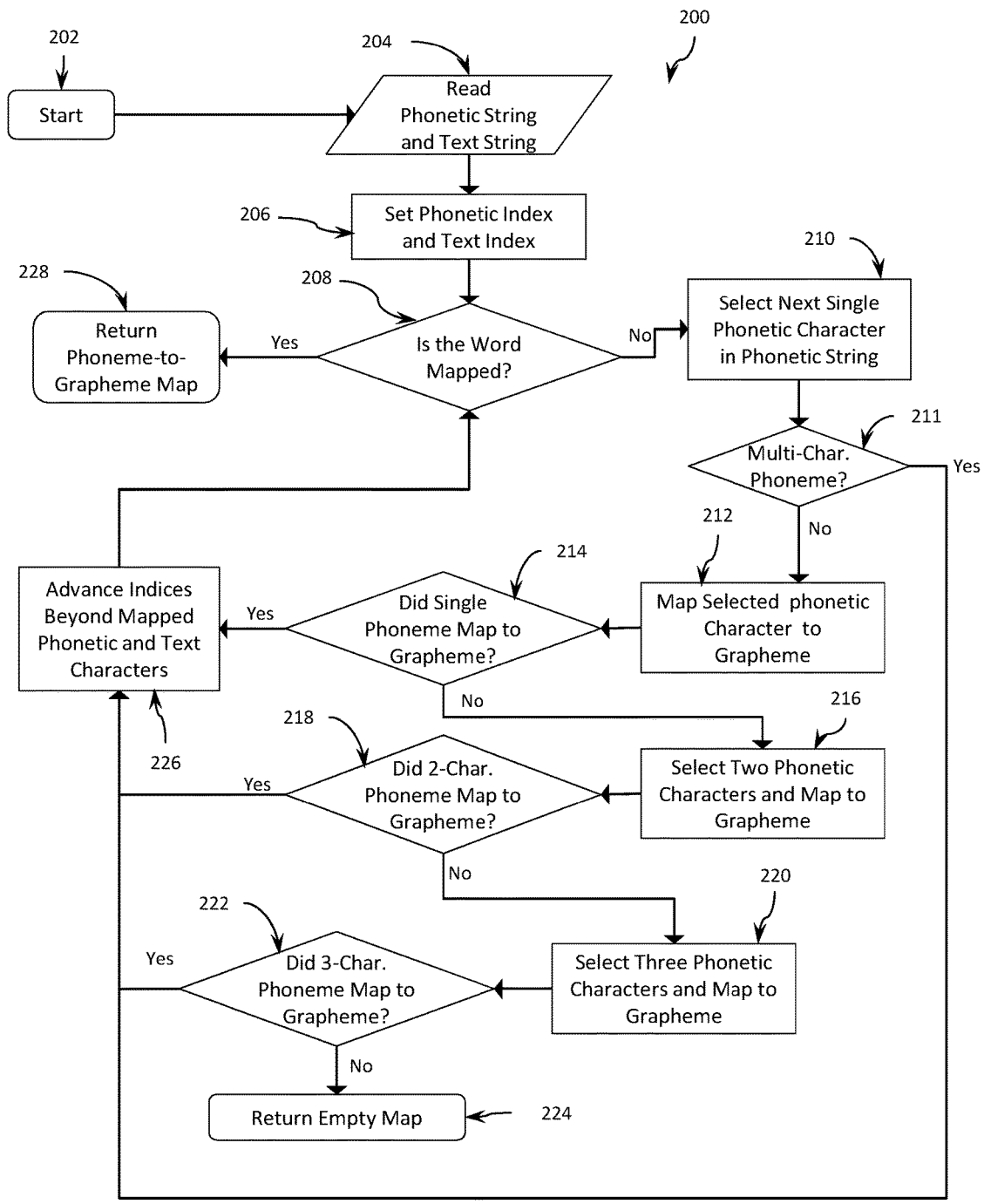
FIG. 2 is a process flow diagram illustrating an embodiment process for mapping each phoneme of a word to a grapheme of the word represented by one or more text characters.

In some embodiments, mapping in block 112 of process 100 may include one or more sub-processes. FIG. 2 illustrates one example of a process 200 executed on a device, such as a computing device (e.g., a processor of a computing device), for mapping each phoneme of a word to a grapheme of the word represented by one or more text characters.

The process 200 may start in block 202, such as by being invoked separately or by another process executing on the processor of the device. The processor executing the process 200 may read a phonetic string and a text string for the selected word in block 204. The processor of the device may set index values for each of the phonetic string and the text string at 206. The processor executing the process 200 may evaluate whether or not the selected word has been mapped in determination block 208. In response to determining that the word is mapped (i.e., determination block 208="yes"), the processor executing the process 200 may return or provide the phoneme to grapheme map in block 228. In response to determining that the word is not mapped (i.e., determination block 208="no"), the processor executing the process 200 may select the next single phonetic character in the phonetic string in block 210.

In some embodiments, the process 200 may include an evaluation process at block 211 to evaluate whether a selected single phonetic character is the first phonetic character in a known phoneme made up of multiple phonetic characters referred to herein as a "multi-phonetic-character phoneme" or more simply a "multi-character phoneme." In some cases, a single phonetic character may be validly mapped to a grapheme as a single-character-phoneme and also as the first character of a multi-character phoneme. However, mapping the single-character phoneme may be an incorrect choice if the character would be better mapped as part of a multi-phonetic-character phoneme.

Multi-character phonemes may be made up of two phonetic characters (a 2-character phoneme), three phonetic characters (a 3-character phoneme). Multi-character phonemes with more than three phonetic characters may occur, but are uncommon in American English. In languages containing multiple-character phonemes made up of four or more phonetic characters, the same methods may be applied by starting with the longest multi-character phonemes and testing progressively shorter multi-character phonemes. An example process for evaluating whether a selected single-character phoneme should be mapped as a multi-character phoneme is described below with reference to FIG. 4. If the evaluation process at block 211 returns a "no" answer indicating that the selected single character is not part of a known multi-character phoneme, then the process 200 may proceed to block 212.

In block 212, the processor executing the process 200 may attempt to map the selected single phonetic character (or single phoneme) to a grapheme made up of one or more of the text characters of the text string. The success of the attempted single-phonetic-character mapping may be tested in determination block 214. In response to determining that the attempted mapping of the single phoneme to the grapheme was successful (i.e., determination block 214="yes"), the processor executing the process 200 may advance the phonetic string index and the text string index to account for the number of text characters and phonetic characters that were successfully mapped in block 226. In response to determining that the attempted mapping of the single phoneme to the grapheme was not successful (i.e., determination block 214="no"), that is if the single-phonetic-character cannot be mapped to a grapheme of the text string, the processor executing the process 200 may proceed to block 216 in which the next two phonetic characters (relative to the index) of the phonetic string may be selected. Further in block 216, the processor executing the process 200 may then attempt to map the selected two-phonetic-character phoneme (or "double phoneme") to a grapheme.

The success of the attempted double-phoneme-character mapping may be determined in determination block 218. In response to determining that the attempted mapping of the double phoneme to the grapheme was successful (i.e., determination block 218="yes"), the processor executing the process 200 may advance the phonetic string index and the text string index to account for the number of text characters and phonetic characters that were successfully mapped in block 226. In response to determining that the double-phonetic-character cannot be mapped to a grapheme of the text string (i.e., determination block 218="no"), the processor executing the process 200 may proceed to block 220 in which the next three phonetic characters of the phonetic string relative to the index may be selected. Further in block 220, the processor executing the process 200 may attempt to map the selected three-phonetic-character phoneme (or "triple phoneme") to a grapheme.

The success of the attempted triple-phoneme-character mapping may be determined in determination block 222. In response to determining that the attempted mapping of the triple phoneme to the grapheme was successful (i.e., determination block 222="yes"), the processor executing the process 200 may advance the phonetic string index and the text string index to account for the number of text characters and phonetic characters that were successfully mapped in block 226. In response to determining the triple-phonetic-character cannot be mapped to a grapheme of the text string (i.e., determination block 222="no"), the processor executing the process 200 may return an empty map in block 224. In other embodiments, the processor executing the process 200 may attempt to map four-phonetic-character phonemes, five-phonetic-character phonemes or phonemes with more characters. If the processor executing a process for mapping phonemes having additional characters successfully maps a phoneme having any number of phonetic characters to a grapheme having any number of text characters, the process may proceed to block 226 at which the phonetic string index and the text string index may be advanced to account for the number of text characters and phonetic characters that were successfully mapped.

The processor executing the process 200, and/or exemplary additional or alternative processes, may set a phonetic string index and a text string index at block 206 using any method of tracking the number of phonetic characters and text characters, respectively, that have been successfully mapped at any particular point in the process 200. For example, the phonetic string index or the text string index may be an integer numeric value indicating the first unmapped character in the respective string. Similarly, advancing the indices in block 226 may comprise increasing each integer numerical value by the number of characters that were successfully mapped.

In alternative embodiments, the phonetic string index or the text string index may be decremented. For example, the text string index may begin at a value equal to a total number of text characters in the word, and advancing the index may comprise subtracting a number of characters that were successfully mapped from the index. In other embodiments, the indices may be advanced by deleting characters that have been successfully mapped. In some such embodiments, setting phonetic index and text index values may be omitted. In further embodiments, any other suitable methods may be used for tracking mapped characters and removing mapped characters from consideration in subsequent iterations of the process 200.

In some embodiments, mapping a phoneme to a grapheme (e.g., in blocks 212, 216, and 220) may involve retrieving data from a data store and comparing portions of the text string to the retrieved data. For example, the system may include a phoneme-grapheme data store containing all known graphemes for each phoneme in the language of words being mapped. For example, the phoneme /j/ (as in jam) can be spelled using the following graphemes: g, gg, gu, gh, gue, tg, gh.

In some embodiments, the phoneme-grapheme data store may be obtained from existing sources. The English language officially contains 44 phonemes, but common lexicon may include words with additional sounds (e.g., up to a total of 57 phonemes or more). Thus, the table of known graphemes for each phoneme may include as many phonemes as desired for a particular lexicon.

With a phoneme-grapheme data store available, mapping a phoneme to a grapheme may comprise identifying the phoneme to be mapped (including identifying one or more phonetic characters), retrieving from the phoneme-grapheme data store all of the possible graphemes corresponding to the phoneme to be mapped, and systematically comparing a portion of the text string of the word to be mapped to the various possible graphemes.

Figure 3:
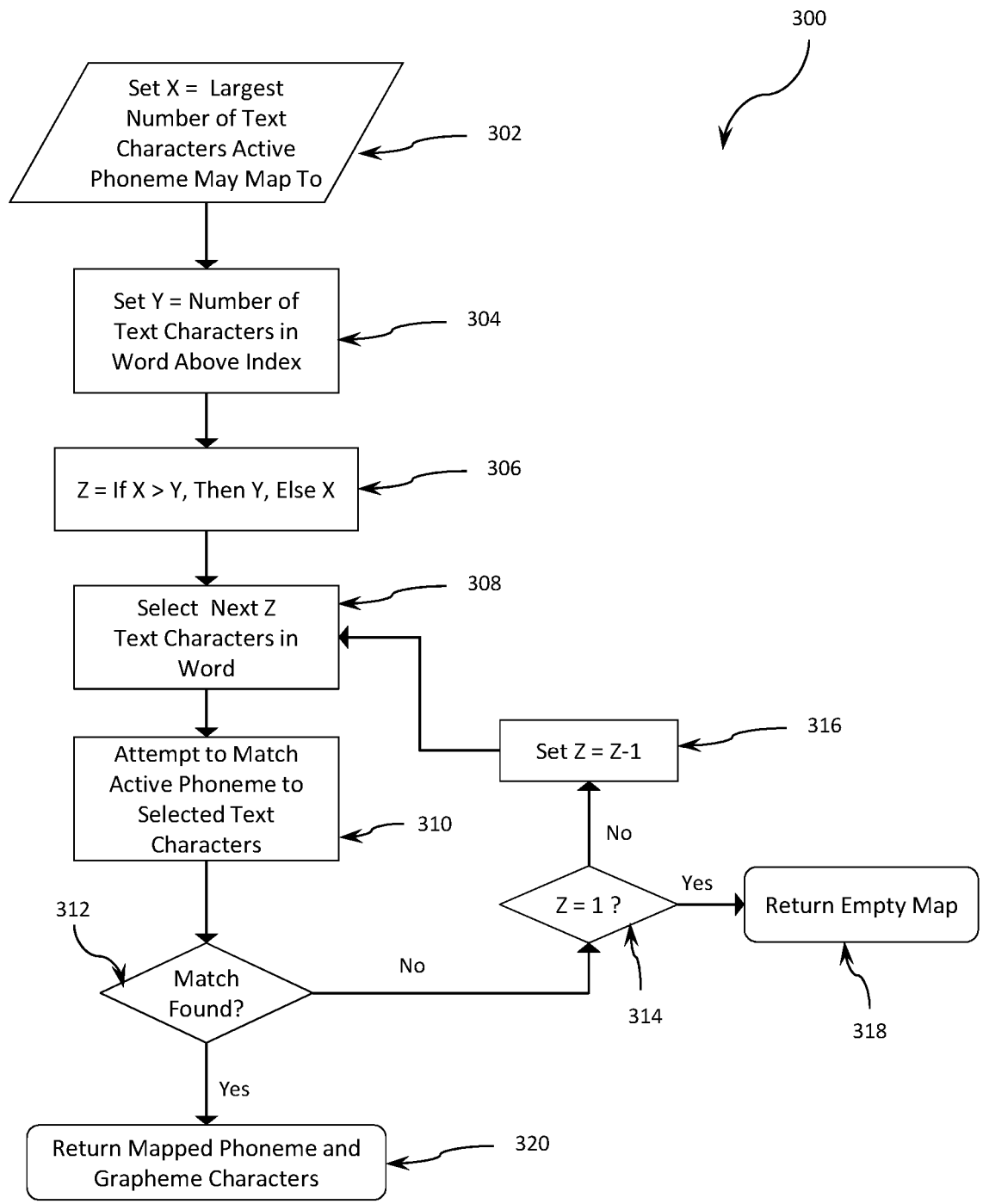
FIG. 3 is a process flow diagram illustrating an embodiment process for mapping a phoneme of any number of phonetic characters to a grapheme of one or more text characters.

FIG. 3 illustrates an example process 300 executed on a device, such as a computing device (e.g., a processor of a computing device), for mapping a phoneme of any number of phonetic characters to a grapheme of one or more text characters. A processor executing the process 300 of FIG. 3 may be configured to systematically map a selected phoneme (referred to as the "active phoneme") to a grapheme present at the index location in the text string. The processor executing the process 300 may perform such mapping, even when the number of text characters in the correctly-matching grapheme is not known in advance by the processor (or the system in which the processor may be located) for the word and phoneme being mapped.

The processor executing the process 300 may attempt to match a portion of the text string for the word to the longest-possible grapheme before testing progressively shorter graphemes until a match is found (or not).

As shown in FIG. 3, the processor executing the process 300 may begin by setting a variable (named "X" in this non-limiting example) to a largest number of text characters to which the active phoneme may be mapped in block 302. In some embodiments, the largest number of text characters may be determined by determining a maximum length (in number of the text characters) of the various graphemes corresponding to the active phoneme as retrieved from a phoneme-grapheme data store.

In block 304, the processor executing the process 300 may set a second variable (named "Y" in this non-limiting example) to the remaining number of text characters in the word to be mapped. In block 306, the processor executing the process 300 may set a third variable (named "Z" in this non-limiting example) to a value depending on a comparison of the first two variables. In block 306 the processor executing the process 300 may determine if the longest of the various graphemes corresponding to the active phoneme is a number of text characters greater than the number of remaining text characters in the word. If so (e.g., if X>Y), then the processor executing the process 300 may set the third variable, Z, to be equal to the number of text characters remaining in the word. The above description may be re-phrased in symbolic terms, that is: if X>Y, then set Z=Y.

On the other hand, if the processor executing the process 300 determines that the number of remaining text characters in the word is greater than or equal to the number of text characters of the longest of the various graphemes corresponding to the active phoneme, then the processor executing the process 300 may set the third variable to the number of characters of the longest of the various graphemes corresponding to the active phoneme. The above description may be re-phrased in symbolic terms, that is: If X is not greater than Y (or if X<=Y), then set Z=X.

In block 308, the processor executing the process 300 may select the next Z characters in the text string of the word to be mapped (i.e., the next Z characters as determined by the text string index value). In block 310, the processor executing the process 300 may attempt to match active phoneme to selected text characters. For example, the selected Z characters from the text string may be compared with each of the graphemes corresponding to the active phoneme as retrieved from the phoneme-grapheme data store.

In determination block 312, the processor may determine whether there is a match between the selected characters and the graphemes. In response to determining that the selected Z characters of the text string are an exact match with one of the graphemes corresponding to the active phoneme (i.e., determination block 312="yes"), the active phoneme has been successfully mapped to the grapheme that matches the selected Z characters of the text string, and the processor executing the process 300 may return an indication of the map of the active phoneme to the matched grapheme in block 320.

In response to determining that the selected Z characters of the text string are not an exact match with any of the graphemes corresponding to the active phoneme (i.e., determination block 312="no"), the processor executing the process 300 may attempt to match a smaller number of characters from the word with one of the graphemes corresponding to the active phoneme.

In determination block 314, the processor executing the process 300 may determine whether the third variable ("Z") is equal to the integer value of "1." In response to determining that the third variable Z is equal to 1 (i.e., determination block 314="yes"), the processor executing the process 300 may return an empty map in block 318 indicating that the processor executing the process 300 has failed to map the active phoneme to a grapheme. In response to determining that the third variable Z is not equal to 1 such as Z is greater than 1 (i.e., determination block 314="no"), the processor executing the process 300 may reduce the value of Z by 1 (i.e., set Z=Z−1). The processor executing the process 300 may repeat the operations in blocks 308, 310, and determination block 312 to determine whether the shorter group of selected characters from the text string matches one of the graphemes corresponding to the active phoneme.

In various embodiments, the processor executing the process 300 may repeat the operations in blocks 308, 310, 312, 314, and 316 as many times as necessary until either a match is found, or until the processor executing the process 300 returns an empty map (e.g., after failing to identify a matching single-character grapheme).

Figure 4:
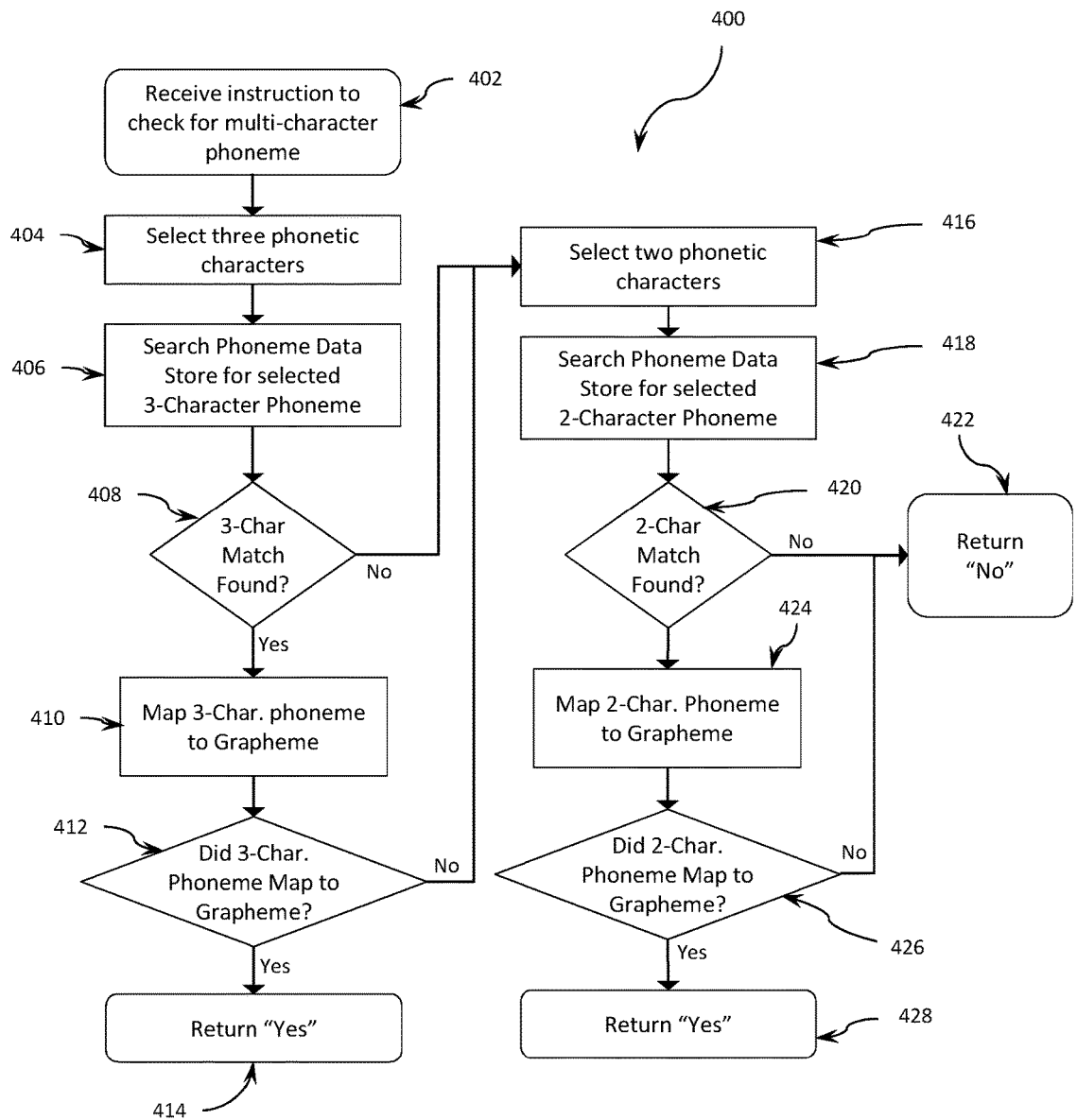
FIG. 4 is a process flow diagram illustrating an embodiment process for mapping a multi-character phoneme.

FIG. 4 illustrates an example process 400 for evaluating a selected single phonetic character for the possibility that it is part of a multi-character phoneme as indicated at block 211 of FIG. 2. The process 400 may begin when invoked by receiving an instruction (e.g., from a user or from another process executing on a processor) to conduct a check to determine whether a selected single character is part of a multi-character phoneme as illustrated at block 402.

In some embodiments, the process 400 may proceed by selecting three phonetic characters at block 404, which may include the single phonetic character selected when the process 400 was invoked (e.g. as part of the process 200 of FIG. 2). At block 406, the process 400 may search a phoneme data store (e.g., as described herein) for all 3-character phonemes matching the selected three phonetic characters. If block 408 indicates that any valid 3-character phonemes matching the selected three phonetic characters are found in the phoneme data store, then the process may proceed to block 410 by attempting to map the selected three-character phoneme to a grapheme at the corresponding position in the text string. If the 3-character phoneme is successfully mapped to a grapheme in the text string, then the process may exit at block 414 by returning a "yes" to a user or to an outer process such as the process 200 of FIG. 2.

If the selected three phonetic characters are not found to match any valid phonemes in the phoneme data store (e.g., an answer of "no" leaving block 408), or if the selected three phonetic characters cannot be mapped to a grapheme in the text string (e.g., an answer of "no" leaving block 412), then the process 400 may proceed to block 416. At block 416, the process 400 may select two phonetic characters beginning with the single phonetic character that may have been selected when the process 400 was invoked. The process 400 may search the phoneme data store for 2-character phonemes matching the selected two phonetic characters at block 418, and if successful may attempt to map the selected two phonetic characters to a grapheme in the text string at block 424. If the 2-character phoneme is successfully mapped to a grapheme of the text string, the process 400 may exit at block 428 with a "yes." If either block 420 or block 426 returns a "no," (i.e., if no phonemes matching the selected 2-character phoneme are found in the phoneme data store at block 418/420 or if the selected 2-character phoneme cannot be mapped to a grapheme in the text string at block 424/426) then the process 400 may exit at block 422 returning a "no" to a user or an outer process such as the process 200 of FIG. 2.

Figure 5:
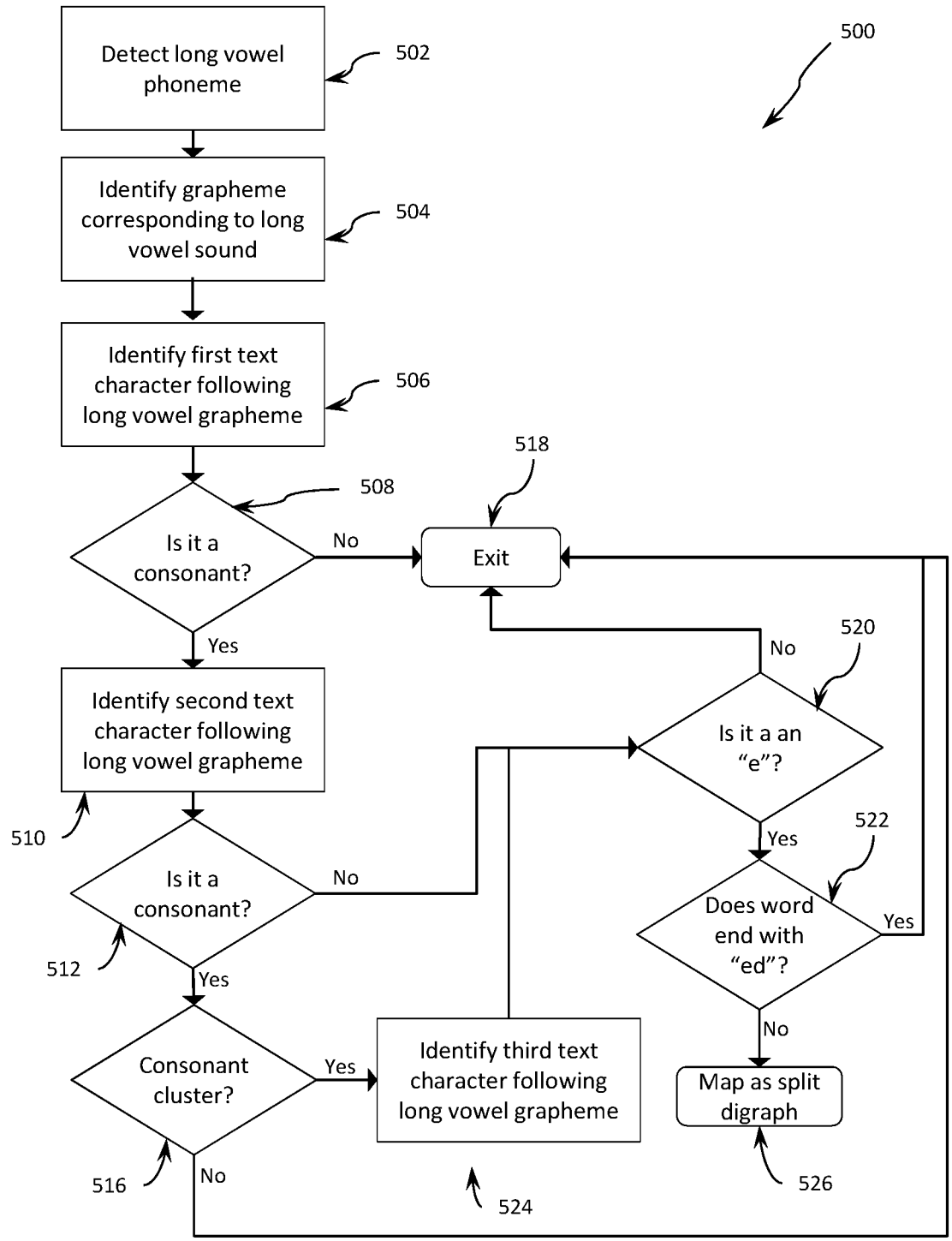
FIG. 5 is a process flow diagram illustrating an embodiment process for mapping a long vowel phoneme to a split-digraph grapheme.

In some embodiments, mapping a selected phoneme to a grapheme (e.g., at block 112 of FIG. 1, at blocks 212, 216, or 220 of FIG. 2 or at blocks 410 or 424 of FIG. 4) may comprise evaluating a phonetic string and a text string to detect and identify a split digraph condition. In the English language, a split digraph is a long vowel sound that is formed by two or more vowel letters that are separated by one or more consonants. For example, the words "lake", "ache", and "lathe" contain split digraphs of the long vowel "a" phoneme. FIG. 5 illustrates an example process 500 for detecting a split digraph and for mapping a long vowel phoneme to a split digraph.

A process 500 for detecting and mapping a split digraph may be invoked when a phoneme selected to be mapped is identified as a long vowel sound as indicated at block 502. Data identifying phonemes corresponding to long vowel sounds may be stored in a data store which may be accessed by a phoneme-to-grapheme mapping process in order to determine whether a selected phoneme is a long vowel phoneme. The process 500 may evaluate the text string to identify the text character (or characters) forming the grapheme corresponding to the long-vowel phoneme at block 504.

The process 500 may identify the first text character immediately following the long-vowel grapheme at block 506 and evaluate it to determine whether it (i.e., the first text character immediately following the long-vowel grapheme) is a consonant at block 508. If the first text character immediately following the long-vowel grapheme is not a consonant, then there is no split digraph, so the split digraph sub-process 500 may exit at block 518 without mapping a split digraph.

If the process determines that the first text character immediately following the long-vowel grapheme is a consonant at block 508, then the process 500 may proceed to identify the second text character following the long-vowel grapheme at block 510. If the process 500 determines that the second text character following the long-vowel grapheme is not a consonant at block 512, then the process 500 may evaluate whether the second text character following the long-vowel grapheme is the letter "e" at block 520. If the second text character following the long-vowel grapheme is the letter "e" then the process 500 may evaluate whether the identified "e" is the penultimate text character in a word that ends with "ed." If the word ends with "ed," it may be preferable to map the "e" to the phoneme "ed" rather than mapping it as a split digraph. In such a case, the process 500 may exit at block 518 without mapping a split digraph.

If the second text character following the long-vowel grapheme is the letter "e" and the subsequent text character is not a "d" at the end of the word, then the process 500 may map the long-vowel text character(s) and the second character following the long-vowel grapheme as a split digraph at block 526.

Mapping the characters as a split digraph may involve associating the long vowel phoneme to the first identified long-vowel text character and the "e" following the consonant (or consonant cluster). Once the long vowel phoneme is mapped to the split digraph vowel text characters, then the mapped text characters may be removed from consideration for future phoneme-grapheme mapping. For example, the mapped text characters may be deleted from the text string, or the character positions may be marked as "mapped" in a way that prevents the system from attempting to map those text characters again.

If the process 500 determines that the second text character following the long-vowel grapheme is a consonant at block 512, then the process 500 may evaluate whether the first and second text characters following the long-vowel grapheme form a valid consonant clusterat block 516 by comparing the first and second text characters following the long-vowel grapheme with a set of known valid consonant clusters obtained from a data store. Valid consonant clusters may include any multi-character consonant cluster in the language, or only two-character consonant clusters known to be found in words containing split digraphs. If block 516 determines that the first and second text characters following the long-vowel grapheme do not form a valid consonant cluster, then the process 500 may exit at block 518 without mapping a split digraph.

If the process 500 determines at block 516 that the first and second text characters following the long-vowel grapheme do form a valid consonant cluster, then the process 500 may identify the third text character following the long-vowel grapheme at block 524 and may proceed to block 520 to determine whether the third text character following the long-vowel grapheme is the letter "e". If not, the split digraph sub-process may exit at block 518 without mapping a split digraph.

If the process 500 determines at block 520 that the third text character following the long-vowel grapheme is the letter "e" and that the subsequent text character is not a "d" at the end of the word, then the process 500 may map the long-vowel text character(s) and the third character following the long-vowel grapheme as a split digraph at block 526, including removing mapped characters from future consideration as described above.

In some embodiments, the existence of compound words may complicate an automated phoneme-to-grapheme mapping process. Compound words are generally those words made up of two or more words concatenated together to form a single word. Some compound words may contain text characters at the intersection of the first and second words that may cause confusion to an automated phoneme-grapheme mapping system. For example, the word "foothill" contains the text characters "th" at the intersection of the two words "foot" and "hill." Based on other rules described the process may attempt to map the word to be pronounced "footh-ill." In order to address such compound words, a mapping process may include a step to check whether a word has been identified as a known compound word, and if so, the system may access syllable separation data for the word from a data store. Syllable separation data may indicate a point between two adjacent phonetic characters and/or text characters at which a syllable break (or syllable separation) occurs. For example, the word "foothill" contains a syllable break between the text characters "t" and "h." Using such syllable separation data, the system may more accurately map the phonemes of a compound word to its text character graphemes.

Processing and Computing Devices

Figure 6:
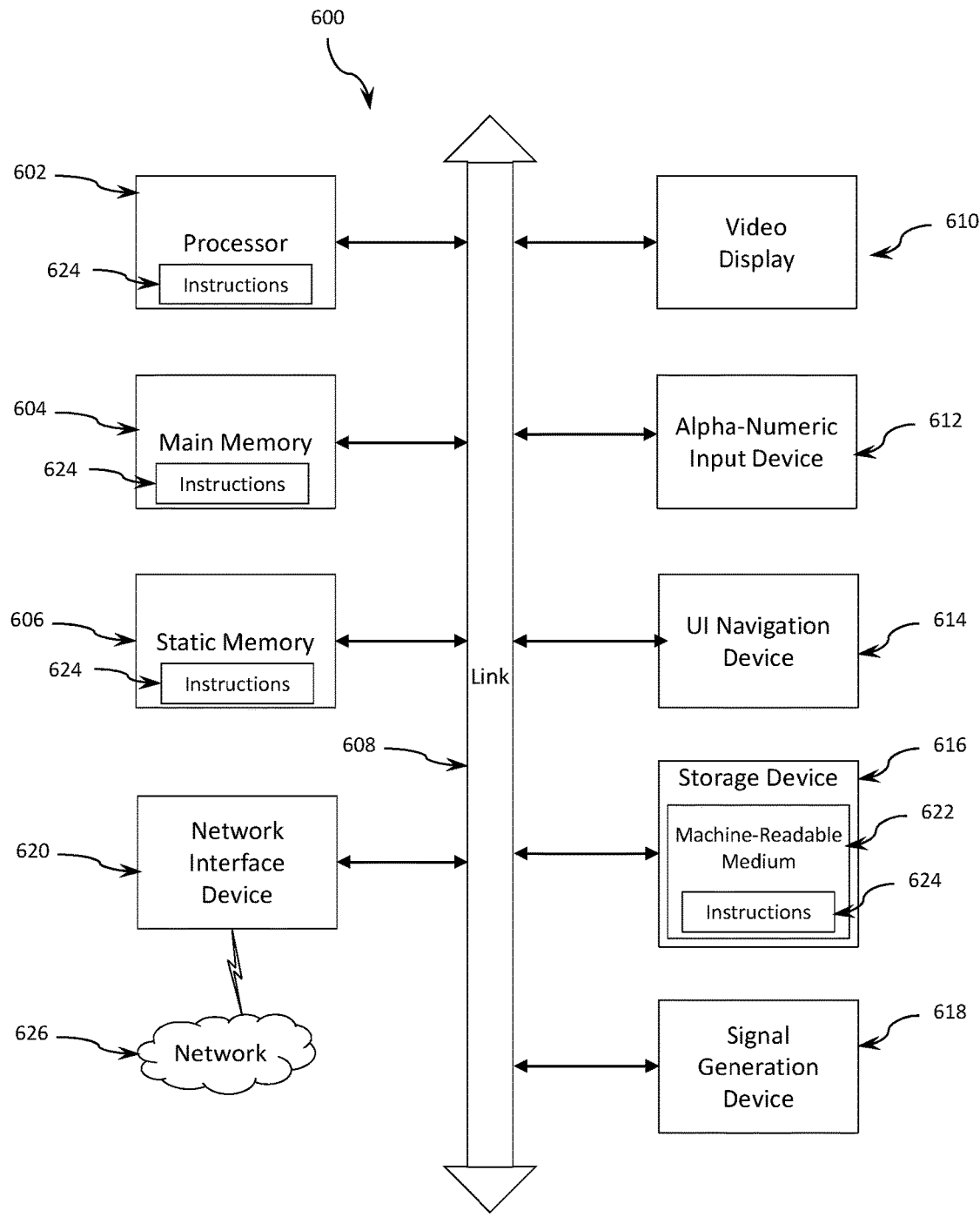
FIG. 6 is a block diagram illustrating a machine in the example form of a computer system.

FIG. 6 is a block diagram illustrating a machine 600, such as in the example form of a computer system, within which one or more sets or sequences of instructions may be executed to cause the machine 600 to perform any one or more of the processes or methods described herein (e.g., some or all of the operations of process 100 of FIG. 1, some or all of the operations of process 200 of FIG. 2, and/or some or all of the operations of process 300 of FIG. 3), according to various example embodiments. In some embodiments, a machine 600 such as that shown in FIG. 6 may operate as a standalone device, may be part of a device, and/or may be connected (e.g., networked) to other machines or devices. In an example, such as where the machine 600 is deployed in a networked environment, the machine 600 may operate in the capacity of either a server or a client machine in server-client network environments, or a machine may act as a peer machine in peer-to-peer (or distributed) network environments.

The machine 600 may be a personal computer (PC), a laptop computer, a desktop computer, a server computer, a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. For example, in some cases, a single physical machine may be configured to operate as multiple virtual machines by separately allocating resources of a physical machine to multiple separate processes.

The example computer system 600 may include at least one processor 602 (e.g., a central processing unit (CPU), a graphics processing unit (GPU) or both, processor cores, compute nodes, etc.), a main memory 604 and a static memory 606, which may communicate with each other via a link 608 (e.g., bus). The computer system 600 may further include a video display unit 610, an alphanumeric input device 612 (e.g., a keyboard, touch screen, etc.), and a user interface (UI) navigation device 614 (e.g., a mouse, touch pad, touch screen, etc.). In some embodiments, the video display unit 610, input device 612 and UI navigation device 614 may be incorporated into a touch screen display.

The computer system 600 may additionally include one or more storage devices 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 (or devices) may include a machine-readable medium 622 on which may be stored one or more sets of data structures and instructions 624 (e.g., software) embodying or utilized by any one or more of the processes, modules, methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

In various embodiments, instructions for separate modules or processes may be stored in storage regions on the one or more storage devices. Additionally, data stores, in the form of databases or other collections of data may also be stored in storage regions on the one or more storage devices. Storage regions may be physically contiguous or non-contiguous on the one or more storage devices, may be any size as needed, and may use any file management system, database management system, or data management system as desired. For example, the phoneme-grapheme data store may include a relational database in which every phoneme in the language to be mapped is associated with every grapheme that may represent that phoneme. Such a phoneme-grapheme data store may be implemented in a SQL database management system, or a non-SQL database management system such as a key-value store.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624 or other data used by one or more process. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP, WAP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any tangible or intangible medium that is capable of storing, encoding, or carrying instructions for execution by the machine, and includes digital or analog communications signals or other medium to facilitate communication of such software.

Any of the devices, modules, data stores, servers, or other computing systems described in the various embodiments herein may include some or all elements of the machine 600 illustrated in FIG. 6 and described herein.

Figure 7:
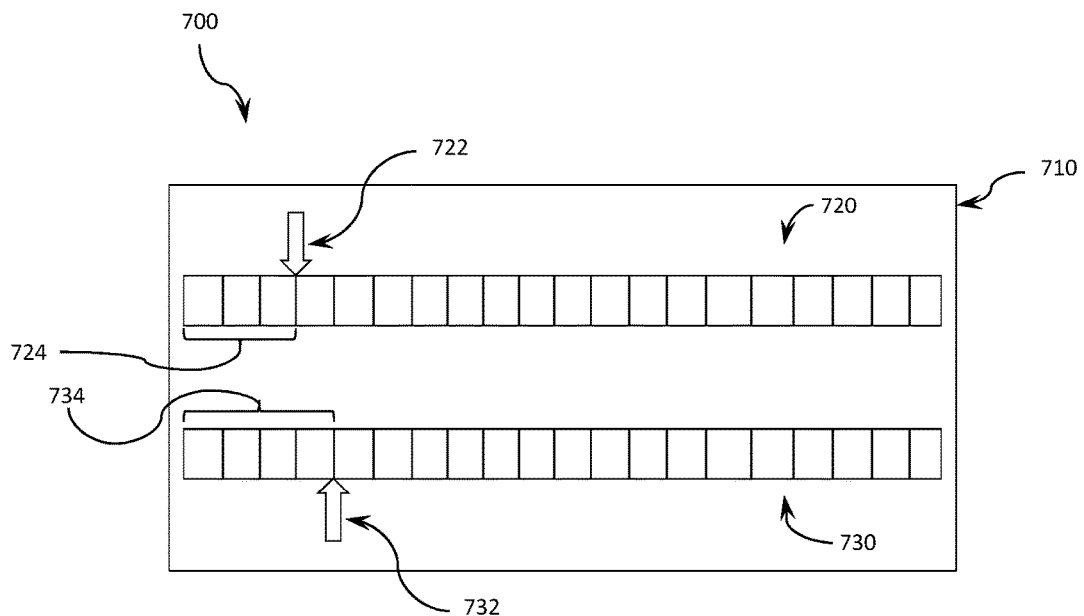
FIG. 7 is a block diagram illustrating a machine in the example form of a computer system.

FIG. 7 is a block diagram illustrating an example 700 of elements that may be implemented using a computer system such as the machine 600 illustrated in FIG. 6, within which one or more sets or sequences of instructions may be executed to cause the machine 600 to perform any one or more of the processes or methods described herein (e.g., some or all of the operations of process 100 of FIG. 1, some or all of the operations of process 200 of FIG. 2, and/or some or all of the operations of process 300 of FIG. 3), according to various example embodiments. In various embodiments, a phoneme to grapheme mapping module 710, may include a phoneme buffer 720 and a text string buffer 730.

Figure 8:
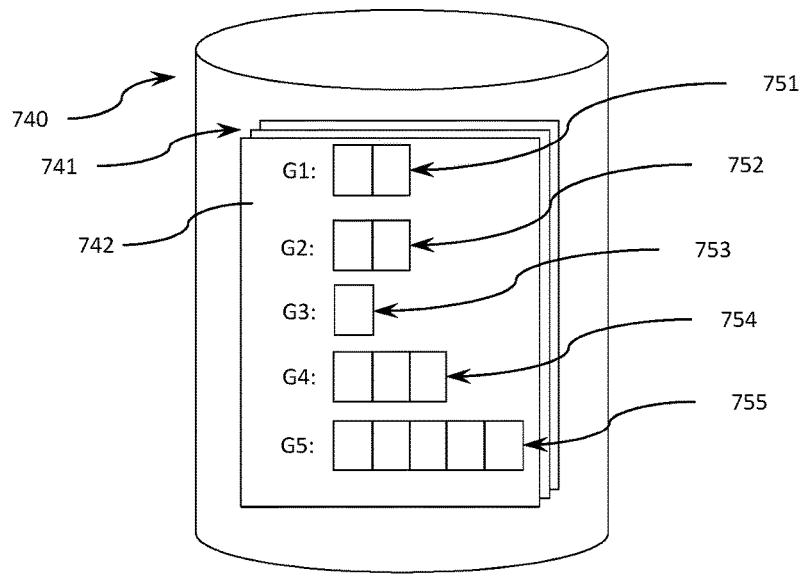
FIG. 8 is a block diagram illustrating a computer system containing stored data elements.

FIG. 8 is a schematic block diagram illustrating an example embodiment phoneme-to-grapheme data store 740 that may be implemented using a computer system such as the machine 600 illustrated in FIG. 6. The data store 740 may contain a plurality of data records 741 (e.g., in a relational database, flat files, key-value store or other data storage system) in which each phoneme in the language to be mapped is associated with every grapheme that may represent that phoneme. FIG. 8 illustrates a single example set 742 of five graphemes (G1 751, G2 752, G3 753, G4 754, and G6 755) associated with a single phoneme.

Various elements of the process 200 and the process 300 may be performed using a phoneme to grapheme mapping module including a phoneme buffer 720 and a text string buffer 730. Each block of the phoneme buffer 720 may represent a position of a single phonetic character of a selected word to be mapped. The total number of blocks in the phoneme buffer 720 may be variably set to match a length of the phonetic string of a word retrieved at step 204 of FIG. 2. The phoneme buffer 720 and the text string buffer 730 may have lengths specified based on the phonetic string and the text string retrieved at step 204 in process 200 (FIG. 2).

Each block of the text string buffer 730 may represent a position of a single text character, and the total number of blocks in the text string buffer 730 may be variably set to match a length of the text string of a word retrieved at step 204 of FIG. 2. The grapheme buffer 730 may have a length measured in a number of blocks that may be set equal to the length of a text string as measured in a total number of text characters in the text string.

Similarly, the phoneme buffer 720 may have a length as measured in a number of blocks that may be equal to the length of the phonetic string as measured in the number of phonetic characters. Notwithstanding the illustrated example, the phoneme buffer 720 and the text string buffer 730 may have equal numbers of blocks (phonetic characters and text characters, respectively), or un-equal numbers of blocks (characters). For example, the phoneme buffer 720 may be longer than, shorter than, or the same length as the grapheme buffer. Each block of the phoneme buffer 720 and the text string buffer 730 may have a discrete memory addresses. In other cases, the blocks of the phoneme buffer 720 and the text string buffer 730 may symbolically represent character positions and need not necessarily define discrete memory addresses.

Upon retrieving the phonetic string for a word (e.g., at step 204 of FIG. 2), the phonetic characters may be placed in sequence into blocks of the phoneme buffer 720 or in associated memory addresses. Upon retrieving the text string for a word (e.g., at step 204 of FIG. 2), the text characters may be placed in sequence into blocks of the text string buffer 730 or in associated memory addresses. The sequence of phonetic strings and text strings may depend on the direction of a language script for example, a phonetic string and/or a text string may proceed sequentially from left to right, right to left, or top to bottom depending on the language script. For the purposes of the present example, a left-to-right language script sequence will be used for both the text string and the phonetic string.

In some embodiments, the step of setting a phonetic index and a text index 206 described above with reference to FIG. 2 may be further understood with reference to FIG. 7. A text string index 732 may be used to identify a relevant text character position within the text string in the text string index 730. A phonetic string index 722 may be used to identify a relevant phonetic character position within the phonetic string in the phoneme index 720. Each index 732, 722 may be advanced to a position following a last character that has been successfully mapped in a previous iteration of a phoneme-to-grapheme mapping process 200 (FIG. 2) and/or 300 (FIG. 3).

In the example illustrated in FIG. 7, the phonetic string index 722 is shown at a position after the third character position, indicating that the first three phonetic characters (indicated by bracket 724) of the word have been mapped to one or more graphemes made up of one or more characters or groups of characters of the text string. The text string index 732 is shown at a position after the fourth character, indicating that the first four text characters of the word have been mapped to one or more phonemes of the phonetic string.

The step of selecting a next single phonetic character in the phonetic string 210 of FIG. 2 may be performed by selecting the single phonetic character in the phonetic string immediately after (e.g., to the right of) the phonetic string index 722, (e.g., the fourth character in the example illustrated in FIG. 7).

The step of mapping the selected phonetic character to a grapheme 212 of FIG. 2 may be performed, for example, by the process shown in FIG. 3, beginning with the first text character to the right of the grapheme index 732 of FIG. 7 (e.g., beginning at the fifth text character in the illustrated example).

The step 302 in FIG. 3 of setting a first variable (e.g., 'X') to a largest number of text characters to which the selected phoneme may be mapped may comprise retrieving a grapheme set 742 containing a plurality of graphemes 751-755 corresponding to the selected phoneme from a grapheme data store 740. The longest grapheme of the set 742 (G5 755 in the illustrated example) may be identified, and the number of text characters in the longest grapheme may be counted. The longest grapheme (G5 755) of the set 742 in the example of FIG. 8 has five characters.

The step 304 of FIG. 3 of setting a second variable (e.g., 'Y') equal to a number of characters in the word above the text string index may comprise counting a number of text characters in the text string buffer 730 after (to the right of in this example) the grapheme index 732, yielding 16 characters in the illustrated example. Continuing the example of FIG. 7 and FIG. 8, the value of 'Z' (308 FIG. 3) may be set equal to the value of 'X,' five, since the number of text characters remaining to be mapped is greater than the number of characters in the longest grapheme of the set of graphemes 742 associated with the current selected phoneme.

The step of selecting the next "Z" text characters in the word (308, FIG. 3) may be performed by selecting a number of characters equal to the value of Z positioned after (to the right of) the text string index 732. In the example of FIG. 7 and FIG. 8, this means selecting the 5 characters immediately to the right of the text string index 732.

The selected characters may then be compared with each of the graphemes (751-755) associated with the phoneme of the single phoneme character selected at step 210 of FIG. 2. In the present example, the set of graphemes 742 contains only one grapheme with exactly five characters (i.e., G5 755). If the identity and sequence of the five characters of the grapheme G5 755 are identical to the identity and sequence of the selected five text characters of the text string in the text string buffer 730, then the grapheme is successfully mapped. In other words, the selected grapheme (G5 755) may be successfully mapped to a group of selected text characters if both the grapheme and the selected text characters of the text string comprise the same text characters in the same sequence. The grapheme of the selected text characters may thereby be mapped to the phoneme of the selected phoneme character(s), because each of the set of tested graphemes 742 is known to be associated with the selected phoneme.

If the selected text string characters (the five characters to the right of the text string index 732 in the present example) do not identically match one of the graphemes (G1-G5 in the present example) associated with the selected phoneme (the single phonetic character to the right of the phoneme index in the present example), then as in steps 312, 314 and 316 of FIG. 3, the variable 'Z' may be decremented by one (i.e., making Z=5−1=4) and returning to step 308. The four text characters to the right of the text string index 732 may be selected and compared with the graphemes G1-G5 associated with the selected phoneme.

Because the grapheme set 742 of the present example does not include any graphemes with exactly four text characters, none of the graphemes G1-G5 will match the selected four text characters of the text string in the text string buffer 730. Therefore, the value of Z may be decremented again, and the three characters to the right of the text string index 732 may be selected and compared with the graphemes G1-G5.

If none of the graphemes G1-G5 matches the selected three text characters, then the two characters to the right of the text string index 732 may be selected and compared with the graphemes G1-G5. As shown in the Example of FIG. 8, the set of set 742 of graphemes G1-G5 associated with the selected phoneme contains two graphemes, G1 and G2 with two text characters. The graphemes G1 and G2 may be compared with the selected two text characters of the text string in the text string buffer 730 in any order desired. For example, the first grapheme to be tested may be chosen alphabetically, reverse alphabetically, randomly, or otherwise. Similarly, if no two-text-character matches are found, the one character to the right of the text string index 732 may be selected and compared with the graphemes G1-G5.

If no group of tested text characters of the text string is successfully matched to the set of graphemes 742 associated with the selected single phonetic character phoneme (i.e., if process 300 ends at block 318), then test 214 of FIG. 2 may reach a result "no", leading the process 200 to block 216. With reference to FIG. 7, the step of selecting two phonetic characters (216 of FIG. 2) may comprise selecting the two phonetic characters of the phonetic string to the right of the phonetic string index 722.

The system may then attempt to map the two-phonetic-character phoneme selected at block 216 to a grapheme using the process 300 of FIG. 3. Similarly to the single-phoneme iteration of process 300 described above with reference to FIG. 7 and FIG. 8, a set of graphemes 742 associated with the selected two-phonetic-character phoneme may be retrieved from a phoneme-grapheme data store 741, and the graphemes of the set 742 may be iteratively compared with groups of characters selected from the text string buffer 730.

Once a phoneme of one or more phonetic characters of the phonetic string in the phoneme buffer 720 is successfully mapped to one or more of the text characters of the text string in the text string buffer 730, the phonetic string index 722 and the text string index 732 may be advanced as indicated in block 226 of FIG. 2. For example, if a two-phonetic-character phoneme of the phonetic string in the phoneme buffer 720 is mapped to a single text character of the text string in the text string buffer 730, the phonetic string index 722 may be advanced two blocks to the right of the position shown in FIG. 7, and the text string index 732 may be advanced my one block to the right of the position shown in FIG. 7.

Positions of the phonetic string index 722 and the text string index 732 may be defined relative to any suitable reference. For example, positions of the phonetic string index 722 and the text string index 732 may be defined numerically with each character position of the phoneme buffer 720 and/or the grapheme buffer being identified with a numeric value which may be assigned (for example) in ascending order from left-to-right. Index positions may also be defined symbolically or using any other addressing system.

Alternatively, logical mechanisms other than text string and phonetic string indices can be used for progressing through a word while mapping phonemes to graphemes. For example, after successfully mapping a phoneme of one or more phonetic characters to one or more text characters of the text string via a grapheme set, the mapped phonetic characters and the mapped text characters may be deleted from their respective strings before proceeding to map the next group of characters. Other indexing mechanisms are also possible. For example, when mapping phonemes to graphemes for languages with a right-to-left script, indices may advance right-to-left. Similarly, when mapping phonemes to graphemes for languages with a top-to-bottom script, indices may advance vertically from top to bottom.

Certain Terminology

Terms of orientation used herein, such as "top," "bottom," "above," and "below" are used in the context of the illustrated embodiments. However, the present disclosure should not be limited to the illustrated orientation. Indeed, other orientations are possible and are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may indicate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the phoneme-to-grapheme mapping systems and methods have been disclosed in the context of certain preferred embodiments and examples, it will be understood by those skilled in the art that this disclosure extends beyond the specifically disclosed embodiments to other alternative embodiments and/or uses of the phoneme-to-grapheme mapping systems and methods and obvious modifications and equivalents thereof. Various modifications to the above embodiments will be readily apparent to those skilled in the art, and the principles described herein may be applied to other embodiments without departing from the spirit or scope of this disclosure. Thus, it is intended that the scope of this disclosure should not be limited by the particular disclosed embodiments described. Various features and aspects of the disclosed embodiments can be combined with or substituted for one another in order to form varying modes of the phoneme-to-grapheme mapping systems and methods. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination. Further, the claims may be drafted to exclude any disclosed element. As such, the foregoing sentence is intended to serve as antecedent basis for use of such exclusive terminology as "solely," "only" and the like in connection with the recitation of claim elements, or use of a "negative" limitation.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited operations.

In summary, various embodiments and examples of phoneme-to-grapheme mapping systems and methods have been disclosed. Although the phoneme-to-grapheme mapping systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

What is claimed is:

1. A method enabling a computer comprising: a user interface; and a processor to automatically correlate phonemes of a word identified from a plurality of words by an input comprising one of: a hyperlink associated with the word; a typed version of the word; a selection of the word based on a selection criteria; and an index value or identifier associated with the word, received from the user interface, with graphemes representing each phoneme of the word, the method comprising performing, with the processor, operations comprising:
    a) retrieving, from a first data store, an instructional text string comprising a plurality of text characters for the word, and a phonetic string comprising a plurality of phonetic characters for the word;
    b) selecting, as a selected phoneme, a first phoneme comprising the first phonetic character of the plurality of phonetic characters of the phonetic string for the word;
    c) searching for a grapheme comprising one or more of the text characters of the instructional text string corresponding to the selected phoneme to generate a map associating phonemes of the phonetic string to graphemes of the instructional text string by:
    i. retrieving, from a phoneme-to-grapheme data store, a list of all possible graphemes corresponding to the selected phoneme, each one of the graphemes of the list of all the possible graphemes comprising one or more text characters;
    ii. identifying a maximum character length based on a longest grapheme among the list of all the possible graphemes corresponding to the selected phoneme;
    iii. determining a number of text characters remaining un-mapped in the instructional text string;
    iv. determining whether the number of remaining text characters is greater than or equal to the maximum character length;
    v. in response to determining that the number of text characters remaining un-mapped is greater than or equal to the maximum character length, selecting a sub-string comprising a sequence of text characters from the instructional text string having a sub-string number of characters equal to the maximum character length and beginning with a first un-mapped text character of the instructional text string;
    vi. in response to determining that the number of text characters remaining un-mapped is less than the maximum character length, selecting, as the sub-string, all of the text characters remaining un-mapped;
    vii. determining whether the selected sub-string is identical to any of the graphemes of the list of all possible graphemes corresponding to the selected phoneme;
    viii. in response to determining that the selected sub-string is not identical to any of the graphemes of the list of all possible graphemes corresponding to the selected phoneme, reducing the sub-string number of characters by one, selecting the reduced sub-string number of characters from the instructional text string as the sub-string, and repeating step vii;
    d) in response to failing to determine by performing steps i-viii, that any selected sub-string is identical to any of the graphemes of the list of all possible graphemes corresponding to the selected phoneme, selecting, as the selected phoneme, a second phoneme comprising the first two phonetic characters of the phonetic string and searching for a grapheme corresponding to the selected second phoneme by performing steps i-viii;
    e) in response to determining that the selected sub-string is identical to any of the graphemes of the list of all possible graphemes corresponding to the selected first phoneme, storing the selected sub-string and identical graphemes of the list of all possible graphemes corresponding to the selected phoneme to the map; and
    f) illustrating a relationship between the phonemes of the phonetic string and the graphemes of the instructional text string by:
    retrieving the map associating the phonemes of the phonetic string to graphemes of the instructional text string, and
    displaying, on a display device of the user interface, the illustration of the relationship between the phonemes of the phonetic string and the graphemes of the instructional text string, based on the retrieved map.

2. The method of claim 1, wherein the processor performs operations further comprising repeating steps b to e for each phoneme of the word until each phoneme of the word is mapped to a corresponding grapheme comprising one or more of the text characters of the instructional text string.

3. The method of claim 1, wherein the processor performs operations further comprising:
    g) detecting a long vowel phoneme in the phonetic string;
    e) identifying a split-digraph by:
    i. identifying a long-vowel grapheme comprising one or more text characters corresponding to the long vowel phoneme;
    ii. identifying a consonant or a consonant cluster in the text string immediately following the long-vowel grapheme;
    iii. identifying a text character "e" immediately following the consonant or consonant cluster, and determining that the identified text character "e" is not part of a word-ending string equal to "ed";
    f) mapping the long-vowel grapheme and the identified text character "e" to the long vowel phoneme, and removing the mapped text characters from consideration by future mapping steps while retaining the consonant or consonant cluster for future mapping steps.

4. The method of claim 1, wherein the processor performs operations further comprising evaluating the phonetic string for presence of a multi-character phoneme by:
- aa) selecting three phonetic characters immediately following a phonetic string index;
- bb) determining whether the selected three phonetic characters may be mapped to a grapheme of the instructional text string;
- cc) in response to determining that the selected three phonetic characters cannot be mapped to a grapheme of the instructional text string, selecting two phonetic characters immediately following the phonetic string index;
- dd) determining whether the selected two phonetic characters may be mapped to a grapheme of the instructional text string.

5. The method of claim 1, wherein the processor performs operations further comprising: displaying, on a display of the user interface, an indication of each grapheme as a separate segment of instructional the text string.

6. A method of processing text enabling a computing device comprising a user interface, to automatically correlate phonemes of the text associated with a word identified from a plurality of words by receiving an input comprising one of: a hyperlink associated with the word; a typed version of the word; a selection of the word based on a selection criteria; and an index value or identifier associated with the word, from the user interface identifying the word, with graphemes representing each phoneme, the method comprising:
- retrieving, by the computing device, an instructional text string comprising a plurality of text characters for the word and a phonetic string comprising a plurality of phonetic characters for the word;
- placing the text characters of the instructional text string in a text string buffer;
- placing the phonetic characters of the phonetic string in a phoneme buffer;
- selecting, by the computing device, as a selected phoneme, a first phoneme comprising a first phonetic character of the phonetic string in the phoneme buffer;
- searching for a grapheme comprising one or more of the plurality of text characters of the instructional text string in the text string buffer corresponding to the selected phoneme of the phonetic string in the phoneme buffer to generate a map associating phonemes of the phonetic string to graphemes of the instructional text string by:
  - i. retrieving, by the computing device, from a phoneme-to-grapheme data store, a list of all possible graphemes corresponding to the selected phoneme, each one of the graphemes of the list of all possible graphemes corresponding to the selected phoneme comprising one or more text characters;
  - ii. identifying, by the computing device, a maximum character length based on a longest of the possible graphemes among the list of all possible graphemes corresponding to the selected phoneme;
  - iii. determining, by the computing device, a number of text characters remaining un-mapped in the instructional text string, and comparing the number of text characters remaining un-mapped with the maximum character length;
  - iv. in response to determining, by the computing device, that the number of remaining un-mapped text characters is greater than or equal to the maximum character length, selecting, by the computing device, a sub-string comprising a sequence of text characters from the instructional text string having a sub-string number of characters equal to the maximum character length and beginning with a first un-mapped text character of the instructional text string;
  - v. in response to determining, by the computing device, that the number of text characters remaining un-mapped in the text string is less than the maximum character length, selecting, by the computing device, all of the text characters remaining un-mapped as the sub-string;
  - vi. determining, by the computing device, whether the selected sub-string matches any of the graphemes of the list of all possible graphemes corresponding to the selected phoneme;
  - vii. in response to determining, by the computing device, that the selected sub-string matches one of the graphemes of the list of all possible graphemes corresponding to the selected phoneme, storing the selected sub-string and matching grapheme of the list of all possible graphemes to the map, advancing a phonetic string index to a position of the phoneme buffer after a last phonetic character corresponding to the selected phoneme, and advancing a text string index to a position of the instructional text string buffer after a last text character corresponding to the matching grapheme in the text string buffer;
  - viii. upon determining, by the computing device, that the selected sub-string does not match any of the possible graphemes corresponding to the selected phoneme, reducing, by the computing device, sub-string number of characters from the text string buffer as the sub-string, and repeating, by the computing device, steps vi and vii;
- storing, by the computing device, first data identifying the first phonetic character comprising the first phoneme in association with the matching grapheme in response to successfully mapping the matching grapheme to the first phoneme;
- selecting, by the computing device, a second phoneme comprising the first two phonetic characters of the phonetic string as the selected phoneme;
- searching for a second grapheme comprising one or more of the plurality of text characters of the instructional text string in the text string buffer corresponding to the selected second phoneme comprising the first two phonetic characters in the phoneme buffer in response to failing to map the first phoneme comprising the first phonetic character in the phoneme buffer;
- storing, by the computing device, the second phoneme comprising the first two phonetic characters in the phoneme buffer in association with the second grapheme comprising one or more text characters in the text string buffer in response to successfully mapping the second grapheme to the second phoneme;
- illustrating a relationship between the phonemes of the phonetic string and the graphemes of the instructional text string by:
- retrieving the map associating the phonemes of the phonetic string to graphemes of the instructional text string, and
- displaying, on a display device of the user interface, the illustration of the relationship between the phonemes of the phonetic string and the graphemes of the instructional text string, based on the retrieved map.

7. The method according to claim 6, wherein searching for the second grapheme comprising one or more of the plurality of text characters of the instructional text string in the text string buffer corresponding to the selected second phoneme in the phoneme buffer comprises repeating steps i-viii with the selected second phoneme as the selected phoneme.

8. A device for processing text comprising:
a user interface comprising a display device and a input device; and
a processor configured with processor executable instructions to perform operations enabling the device to automatically correlate phonemes of the text with graphemes representing each phoneme, the text associated with a word identified from a plurality of words by receiving an input from the input device of the user interface, the input comprising one of: a hyperlink associated with the word; a typed version of the word; a selection of the word based on a selection criteria; and an index value or identifier associated with the word, identifying the word, the operations comprising:
defining a phoneme buffer;
defining a text string buffer;
retrieving an instructional text string comprising a plurality of text characters for the word and placing the text string in the text string buffer;
retrieving a phonetic string comprising a plurality of phonetic characters for the word and placing the phonetic string in the phoneme buffer;
selecting, as a selected phoneme, a first phoneme comprising a first phonetic character of the phonetic string in the phoneme buffer;
searching for a grapheme comprising one or more of the plurality of text characters of the instructional text string in the text string buffer to the selected phoneme to generate a map associating phonemes of the phonetic string to graphemes of the instructional text string, by:
i. retrieving, from a phoneme-to-grapheme data store, a list of all possible graphemes corresponding to the selected phoneme, each one of the possible graphemes comprising one or more text characters;
ii. determining a maximum character length based on a longest of the possible graphemes among the list of all possible graphemes corresponding to the selected phoneme;
iii. determining a number of text characters remaining un-mapped in the text string, and comparing the number of text characters remaining un-mapped with the maximum character length;
iv. in response to determining that the number of text characters remaining un-mapped in the string is greater than or equal to the maximum character length, selecting a sub-string comprising a sequence of text characters from the instructional text string having a sub-string number of characters equal to the maximum character length and beginning with a first un-mapped text character of the instructional text string;
v. in response to determining that the number of text characters remaining un-mapped in the text string is less than the maximum character length, selecting all of the text characters remaining un-mapped as the sub-string;
vi. determining whether the selected sub-string matches any of the graphemes of the list of all possible graphemes corresponding to the selected phoneme;
vii. in response to determining that the selected sub-string matches one of the graphemes of the list of all possible graphemes corresponding to the selected phoneme, storing the selected substring and matching grapheme of the list of all possible graphemes to the map, advancing a phonetic string index to a position of the phoneme buffer after a last phonetic character corresponding to the selected phoneme, and advancing a text string index to a position of the text string buffer after a last of the selected sub-string text characters in the text string buffer; and
viii. in response to determining that the selected sub-string does not match any of the graphemes corresponding to the selected phoneme, reducing the sub-string number of characters by one, selecting the reduced sub-string number of characters from the text string as the sub-string, and repeating steps vi and vii;
storing first data identifying the first phonetic character comprising the first phoneme in association with the matching grapheme in response to successfully mapping the matching grapheme to the first phoneme;
selecting a second phoneme comprising the first two phonetic characters of the phonetic string as the selected phoneme;
searching for a second grapheme comprising one or more of the plurality of text characters of the instructional text string in the text string buffer corresponding to the selected second phoneme comprising the first two phonetic characters in response to failing to map the first phoneme comprising the first phonetic character in the phoneme buffer;
storing the second phoneme comprising the first two phonetic characters in association with the second grapheme comprising one or more text characters in the text string buffer in response to successfully mapping the second grapheme to the second phoneme; and
illustrating a relationship between the phonemes of the phonetic string and the graphemes of the instructional text string by:
retrieving the map associating the phonemes of the phonetic string to graphemes of the instructional text string, and
displaying, on the display device of the user interface, the illustration of the relationship between the phonemes of the phonetic string and the graphemes of the instructional text string, based on the retrieved map.

9. The device according to claim 8, wherein the processor is further configured with processor executable instructions to perform operations such that searching for the second grapheme comprising one or more of the plurality of text characters of the instructional text string in the text string buffer corresponding to the selected second phoneme in the phoneme buffer comprises repeating steps i-vii with the selected second phoneme as the selected phoneme.

10. A non-transitory computer-readable storage medium storing processor executable instructions, which when read and executed by a processor are configured to cause the processor to perform operations enabling a computer comprising a user interface, to automatically correlate phonemes of a word identified from a plurality of words by receiving an input from the user interface identifying the word, the input comprising one of: a hyperlink associated with the word; a typed version of the word; a selection of the word based on a selection criteria; and an index value or identifier associated with the word, with graphemes representing each phoneme, the operations comprising:
retrieving an instructional text string comprising a plurality of text characters for the word and a phonetic string comprising a plurality of phonetic characters for the word;
placing the text characters of the instructional text string in a text string buffer;

placing the phonetic characters of the phonetic string in a phoneme buffer;

selecting, as a selected phoneme, a first phoneme comprising a first phonetic character of the phonetic string;

searching for a first grapheme comprising one or more of the plurality of text characters of the instructional text string corresponding to the selected first phoneme to generate a map associating phonemes of the phonetic string to graphemes of the instructional text string by:

i. retrieving, from a phoneme-to-grapheme data store, a list of all possible graphemes corresponding to the selected phoneme, each one of the graphemes of the list of all possible graphemes corresponding to the selected phoneme comprising one or more text characters;

ii. determining a maximum character length based on a longest of the possible graphemes among the list of all possible graphemes corresponding to the selected phoneme;

iii. determining a number of text characters remaining un-mapped in the instructional text string, and comparing the number of text characters remaining un-mapped with the maximum character length;

iv. in response to determining that the number of text characters remaining un-mapped is greater than or equal to the maximum character length, selecting a sub-string comprising a sequence of text characters from the instructional text string having a sub-string number of characters equal to the maximum character length and beginning with a first un-mapped text character of the text string;

v. in response to determining that the number of text characters remaining un-mapped in the text string is less than the maximum character length, selecting all of the text characters remaining un-mapped as the sub-string;

vi. determining whether the selected sub-string matches any of the graphemes of the list of all possible graphemes corresponding to the selected first phoneme;

vii. in response to determining that the selected sub-string matches one of the graphemes of the list of all possible graphemes corresponding to the selected phoneme, storing the selected sub-string and matching grapheme to the list of all possible graphemes to the map, advancing a phonetic string index to a position of the phoneme buffer after a last phonetic character corresponding to the selected phoneme, and advancing a text string index to a position of the instructional text string buffer after a last text character corresponding to the matching grapheme in the text string buffer; and viii. in response to determining that the selected sub-string does not match any of the possible graphemes corresponding to the selected phoneme, reducing the sub-string number of characters by one, selecting the reduced sub-string number of characters from the text string as the sub-string, and repeating steps vi and vii;

storing first data identifying the first phonetic character comprising the first phoneme in association with the matching grapheme in response to successfully mapping the matching grapheme to the first phoneme;

selecting a second phoneme comprising the first two phonetic characters of the phonetic string as the selected phoneme;

searching for a second grapheme comprising one or more of the plurality of text characters of the instructional text string to the selected second phoneme comprising the first two phonetic characters in response to failing to map the first phoneme comprising the first phonetic character;

storing the second phoneme in association with the first grapheme in response to successfully mapping the first grapheme to the second phoneme; and illustrating a relationship between the phonemes of the phonetic string and the graphemes of the instructional text string by:

retrieving the map associating the phonemes of the phonetic string to graphemes of the instructional text string, and displaying, on a display device of the user interface, the illustration of the relationship between the phonemes of the phonetic string and the graphemes of the instructional text string, based on the retrieved map.

\* \* \* \* \*